3,318,379
FORMING FOAM UNDER RESERVOIR CONDITIONS IN PETROLEUM RECOVERY PROCESS

Donald C. Bond and George G. Bernard, Crystal Lake, Ill., assignors, by mesne assignments, to Union Oil Company of California, Los Angeles, Calif., a corporation of California
No Drawing. Filed Aug. 5, 1964, Ser. No. 387,768
13 Claims. (Cl. 166—9)

This invention relates to the recovery of petroleum oil from subterranean oil bearing reservoirs and formations. It is more specifically concerned with improving the efficiency of those secondary recovery processes wherein a bank or banks of foam are formed in situ and driven through the formation.

In U.S. Patent 2,866,507 (wherein one of the inventors, D. C. Bond, is also one of the coinventors of the instant invention) there is described and claimed a gas-drive secondary recovery process wherein the process is carried out in the presence of surface-active agents or surfactants whereby the efficiency of the gas-drive is enhanced by the formation of a foam bank at the drive gas-residual oil interface. The art is also knowledgeable of the fact that greater oil recoveries may be had wherein a bank of surfactant solution is introduced into the reservoir prior to the injection of a solvent wherein the solvent is driven through the reservoir by a gas-drive, such as described in U.S. Patent 3,100,524.

While oil recoveries utilizing these methods have generally been economically attractive, their use on a large commercial scale has generally been precluded by the foam's attendant plugging effect upon the formation in which the processes are practiced. That is to say, the instantaneous formation of a foam bank or banks, generated in situ, within the immediate area of the injection well has had the deleterious result of plugging the interstices of the formation or reservoir making subsequent fluid injection impracticable because of the high pressures needed to move the foam bank or banks through the formation. In some instance complete plugging has resulted making further gas or liquid injection impossible.

It has now been discovered that a two-fold beneficial effect may be had in those methods using foam by disposing foaming agent or surfactant outside the immediate area of the injection well bore. Firstly, prior to foam bank formation the reservoir rock is acted upon by the surfactant or surface-active agent to wet the reservoir rock. Secondly, the surfactant by the generation of a viscous foam will act to confine subsequently injected gas within that portion of the formation to be produced thereby preventing the gas from channeling through the formation and being lost therein. In practicing the invention, an extremely large pressure gradient will not exist between the area immediate to the injection well and the remainder of the formation because foam for all practical purposes will not be generated within this area.

In essence the invention consists in introducing into the reservoir or formation a surfactant or foaming agent followed by a sufficient quantity of non-gaseous, surfactant-free liquid to displace the initially injected surfactant from the area immediate to the injection well. The displacement distance should be equal to at least 3–6% of the distance between the injection well and nearest production well. (The Petroleum Production Handbook authored by T. C. Frick (McGraw-Hill, 1962) indicates that about 30% of the total pressure drop from the injection to the production well occurs in about 6% of the distance between the two wells). Thereafter, according to one embodiment, gas injection is instituted whereby foam formation within the reservoir occurs in the area somewhat removed from the immediate vicinity of the injection well.

It is an object of this invention to provide a method of secondary oil recovery wherein surfactants and foaming agents are utilized most effectively.

It is another object of this invention to provide a method of producing petroleum from subterranean reservoirs and formations wherein the efficiency of a fluid drive is greatly enhanced and wherein lower fluid injection pressures may be utilized.

It is a further object of this invention to provide a method of utilizing surfactants, surface-active agents and foam producing agents in a manner whereby generation of foam does not occur within the immediate vicinity of injection wells into which they are injected.

Still another object of this invention is to provide a combination gas and water-drive secondary recovery process wherein a bank or banks of foam are employed to stimulate residual oil recovery from subterranean oil formations and reservoirs.

A further object of this invention is to provide a method of augmenting a foam bank in a subterranean formation wherein the foam bank is being driven through the formation by a fluid drive.

These and other objects will become apparent from the following detailed description of the invention.

In accordance with the present invention a surfactant, foaming agent or surface-active agent having foam producing characteristics is injected into an injection well of a subterranean formation either by itself if its form permits or in a vehicle in which the foam producing agent is miscible. Thereafter a sufficient quantity of surfactant-free, non-gaseous liquid, miscible with the first injected material, is injected to move or displace the surfactant, from the injection well, a distance equivalent to about 3 to 6% of the distance between the injection well and production well towards which the fluids are to be driven. Thereafter, according to one embodiment, a gas-drive is instituted and continued until a major portion of the initially injected materials is produced from the formation or until the recovery of oil at one or more production wells becomes economically unattractive. Another embodiment of this invention comprises injecting into the formation in sequence, successive slugs of foaming agent, water, and gas in a repetitive fashion until the ratio of oil to produced fluids at the production well becomes exceedingly low.

It is believed that the improved results obtained in accordance with the invention arise in several manners. Ostensibly, the injection of the surfactant or surface active agent transforms the reservoir from a water-wet to an oil-wet state and thusly facilitates the removal of petroleum oil contained within the interstices of the formation. Since a foam bank or banks are not generated within the immediate injection well area, extremely large pressure drops are not developed between the area surrounding the injection well and the remainder of the formation which permits subsequent fluid injection into the formation at lower pressures than were heretofore possible.

Surface-active-agents, and foam producing agents will hereinafter be referred to in the specification and appended claims as a "surfactant." The surfactant preferably should be one capable of forming a stable foam under formation or reservoir conditions when it is intimately contacted with a liquid and a gas. The surfactants may be either anionic, cationic or non-ionic so long as they meet the basic prerequisite stated above and may be selected from commercially published lists which describe their properties. Information concerning such surfactants may be found in Encyclopedia of Surface Active Agents by J. P. Sisley translated from the French by P. J. Wood, Chemical Publishing Company, New York, 1952. If appropriate, the surfactant may be injected into the formation alone where sufficient connate water is present or it may be incorporated in an aqueous or liquid hydrocarbon vehicle. The use of a vehicle will act to more readily disperse the surfactant within the interstices of the formation. Of course if the surfactant is to be incorporated in an aqueous solution, a water-soluble surfactant is preferred and where the surfactant is incorporated in a liquid hydrocarbon carrier such as L.P.G., kerosene, natural gasoline, etc., an oil-soluble surfactant is preferred. Where a liquified, normally-gaseous hydrocarbon carrier is utilized care must be taken to use sufficiently high pressures to prevent the hydrocarbon from vaporizing. Vaporization of the hydrocarbon would generate foam within the area immediate to the injection well which would vitiate the essence of the invention.

An example of a satisfactory oil-soluble surfactant is a 1:1 mixture of dicoco dimethyl ammonium chloride and decyl trimethyl ammonium chloride, while an example of a water-soluble surfactant is polyoxethylated octylphenol known commercially under the trade name "Triton X–100." Other examples of suitable foam producing agents include dimethyl didodecenyl ammonium chloride, methyl trioctenyl ammonium iodide, trimethyl decenyl ammonium chloride, dibutyl dihexadecenyl ammonium chloride, and water-soluble salts of esters of $C_3$–$C_6$ sulfo dicarboxylic acids having the general formula

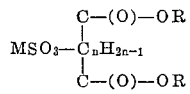

where M is a substituent forming a water-soluble salt, such as alkali metals, ammonium, and substituted ammonium, R is $C_3$–$C_{16}$ alkyl substituent, and $n$ is an integer from 1–4, e.g., monosodium dioctyl sulfosuccinate, ammonium dilaurylsulfosuccinate, monosodium dibutyl sebacate, monosodium diamyl sulfoadipate, and others; and water-soluble perfluoralkanoic acids and salts having 3–24 carbon atoms per molecule, e.g., perfluorooctanoic acid, perfluoropropanoic acid, perfluorononanoic acid. Other surfactive agents which may be used in the practice of this invention are:

| Trade name: | Chemical name |
|---|---|
| Aerosol C–61 | Ethanolated alkyl guanidine-amine complex. |
| Aerosol OS | Isopropyl naphthalene sodium sulfonate. |
| Aerosol OT | Dioctyl sodium sulfosuccinate. |
| Arquad 2C | Dicoco dimethyl ammonium chloride. |
| Arquad T | Tallow trimethyl ammonium chloride. |
| Duponol EP | Fatty alcohol alkylolamine sulfate. |
| Duponol RA | Modified ether alcohol sulfate sodium salt. |
| Duponol WAQ | Sodium lauryl alcohol sulfate. |
| Ethomid HT–60 | Condensation of hydrogenated tallow amide and ethylene oxide. |
| Hyonic FA–75 | Modified fatty alkylolamide. |
| Miranol HM concentrate | Ethylene cyclomido 1-lauryl, 2-hydroxy ethylene Na alcoholate, methylene Na carboxylate. |
| Miranol MM concentrate | Same as Miranol HM except myristyl group is substituted for lauryl group. |
| Nacconal NR | Alkyl aryl sulfonate. |
| Ninol AA62 | Lauric diethanolamide. |
| Ninol 1001 | Fatty acid alkanolamide. |
| Petrowet R | Sodium alkyl sulfonate. |
| Pluronic L44 | Condensation product of ethylene oxide with propylene glycol. |
| Product BCO | C-cetyl betaine. |
| Renex 650 | Polyoxyethylene alkyl aryl ether. |
| Sorbit AC | Sodium alkyl naphthalene sulfonate. |
| Sulfanole FAF | Sodium salt of fatty alcohols, sulfated. |
| Triton AS–30 | Sodium lauryl sulfate. |
| Triton X–100 | Alkyl aryl polyether alcohol. |
| Span 20 | Sorbitan monolaurate. |
| Span 40 | Sorbitan monopalmitate. |
| Span 85 | Sorbitan trioleate. |
| Tween 65 | Polyoxyethylene sorbitan tristearate. |
| Tween 81 | Polyoxyethylene sorbitan monooleate. |
| OPE 1 | Octylphenoxyethanols. |
| OPE 2 | Octylphenoxyethanols. |
| OPE 3 | Octylphenoxyethanols. |
| Triton GR–7 | Dioctyl sodium sulfosuccinate. |
| Triton B–1956 | Modified phthalic glycerol alkyl resin. |
| Triton X–45 | Isoctyl phenyl polyethoxy ethanol about 5 ethoxy groups per molecule). |

While the surfactants utilized in accordance with the invention may be injected into the formation in and of themselves, it is preferred that they be incorporated in aqueous solutions. Therefore, it should be understood that many surfactants which are primarily oil-soluble, nevertheless have sufficient water solubility to permit their use in aqueous solutions and have the ability to form tenacious foams under reservoir temperatures and pressures.

Preferably the surfactants utilized in this invention are those which form a stable foam in the presence of crude oil; in reservoirs where the interstitial water contains a high concentration of salt, a surfactant is used which foams readily in the presencce of oil and brine.

The concentration of surfactant in the aqueous solution employed in accordance with the invention will depend in large part on the particular agent utilized and the type of formation which is to be produced. For instance, where a particular type of formation creates a condition under which much of the surfactant is adsorbed or absorbed in the interstices of the formation it will be necessary to employ a greater amount of surfactant so that a sufficient amount will remain to form a foam bank within the reservoir upon the subsequent injection of a gas. Surfactant concentrations between about 0.01 to 10 weight percent of the solution in which they are incorporated are generally suitable for purposes of the invention with the preferable concentration being about 0.1 to 1.0 weight percent.

The quantity of surfactant vehicle or carrier will depend largely upon such well recognized factors as the recovery pattern, the spacing between wells, the porosity of the formation, and the thickness of the formation.

Ideally the quantity of vehicle or carrier employed should be such that a sufficient amount of liquid is available to completely foam the surfactant solution upon the intimate contact of the solution with a gas. Since the amount of solution required to accomplish this cannot be precisely determined in advance, the most convenient method of expressing the quantity of surfactant solution to be used is in terms of reservoir pore volume. In general from about 0.01 to 0.3 pore volume of solution will be utilized with the preferred range being about 0.05 to 0.10 pore volume. Quantities in the upper part of this range may be required for operations in which relatively dilute solutions are employed or in which surfactants having an affinity to absorb upon the rock to a high degree are used. Lesser quantities may be utilized where the surfactant employed is a highly effective one and where the concentration of the solution is high.

The fluid utilized to displace the surfactant or surfactant solution the minimum radial distance of about 3–6% of the distance between the injection well and production well will normally comprise a surfactant-free, non-gaseous fluid such as water, brine, oil, kersoene, L.P.G., etc. The quantity of liquid necessary for effective surfactant displacement will depend to a great extent on the porosity and thickness of the formation, and other factors heretofore alluded to. Where the surfactant per se is injected into the formation a sufficient quantity of liquid should be injected not only to displace the surfactant but also to provide the minimum amount of liquid necessary to cause complete foaming or generation of foam when the surfactant is contacted by a gas. The quantity of surfactant-free, non-gaseous liquid will generally lie in the range of about 0.001 to 0.10 pore volume with a preferred practical range of about 0.001 to 0.01 pore volume being sufficient under most conditions. It is critical to the practice of this invention that the displacing liquid be substantially free of dissolved gases and surface-active agent, foaming agent or surfactant materials so as to substantially preclude the generation or formation of a viscous foam within the area immediately adjacent the injection well. However, it is to be understood that some instances will arise where all of the surfactant is not effectively displaced from the injection well area. Under those conditions, the generation of a small amount of foam will not adversely affect the over all process to an appreciable extent.

In carrying out the process of the invention, the surfactant or surfactant solution is first injected into the reservoir through one or more injection wells arranged in a logically spaced pattern. Five spot, seven spot or other conventional well patterns may be utilized and generally are preferable. After a sufficient amount of surfactant to effect the formation of a tenacious foam bank within the formation has been introduced, a quantity of surfactant-free, non-gaseous liquid is then injected into the injection well and through the formation in an amount sufficient to displace the initially injected surfactant or surfactant solution the aforesaid minimum radial distance. Under normal well spacing this distance will be about 10 to 50 feet from the injection well.

Where the surfactant is introduced in a liquefied, normally-gaseous hydrocarbon such as L.P.G. or where the displacing liquid itself is L.P.G., etc., sufficient pressure will have to be maintained on the reservoir to prevent vaporization of the liquefied hydrocarbons so that gases will not come out of solution and generate an appreciable amount of foam within the immediate vicinity of the well bore.

It will be readily apparent to those skilled in the art that pressure maintenance is only necessary while the surfactant is being displaced from the injection well area. Thereafter the volatilization of the liquefied, normally-gaseous hydrocarbon will have no adverse effect and in some instances may actually produce a favorable result. Upon volatilization, gas will be made immediately available for foam generation thereby obviating the necessity of depending upon the subsequent injection of the principal driving fluid to accomplish foaming. The pressures utilized will of course depend upon the temperature of the reservoir and the vapor pressure of the particular hydrocarbons employed. For instance, where propane is used as the vehicle, pressures between about 200 p.s.i. and about 600 p.s.i. will normally be required to maintain the propane in the liquid state at ordinary reservoir temperatures between about 80°–200° F. Higher pressures will be required if ethane is utilized while somewhat lower pressures will suffice where butane is employed. Pressures approaching the reservoir fracturing pressures may be utilized if desired. Reservoir pressures may be controlled by regulating the back pressure at the production well or wells. Where a liquefied, normally-gaseous hydrocarbon surfactant vehicle is used, the displacing liquid must also be injected at these same pressures so as to prevent any flashing or volatilization of the liquefied hydrocarbon within the area of the formation immediate to the injection well. It is essential that some miscibility be maintained between the injected materials, so that the surfactant may be readily driven from the injection well area. Thus where the surfactant vehicle is a hydrocarbon, the displacing liquid should also be a hydrocarbon. Alternatively where the initially injected surfactant slug is aqueous, the displacing fluid should also be aqueous.

In one embodiment of this invention after the bank of surfactant or surfactant solution and the bank of surfactant-free, non-gaseous liquid have been introduced into the reservoir, they are propelled through the reservoir toward one or more production wells by a driving fluid. The driving fluid may be any of the art-recognized drive media including liquid and gasiform fluids. The gasiform driving fluid used will ordinarily be natural gas but, air, methane, engine exhaust gases and other similar gases may be employed. Examples of liquid driving fluids are water and carbonated water. Where a liquid driving fluid is utilized a sufficient amount of gas will have to be injected after the displacing fluid to generate the foam bank in situ. However, where the surfactant vehicle and/or displacing fluid is a liquefied, normally gaseous hydrocarbon the necessary gas disposition in proximity to the surfactant to generate foam can be achieved by merely decreasing the pressure within the formation thereby allowing volatilization of the liquid hydrocarbon. Upon the introduction of the gas, the gas will tend to channel through the formation until it reaches the surfactant or surfactant solution at which time a tenacious foam bank is formed within the interstices of the formation. As more and more gas is injected, the foam bank moves steadily towards the open producing wells thereby displacing formation fluids, such as connate water and petroleum oil, before it and will also confine the driving gas within a relatively finite area. That is, the formation of the foam bank prevents the subsequently injected gas from channeling through the formation without effectively moving the oil before it. Gas injection is continued until the fluids produced from the production well have a relatively low oil content thereby indicating that further recovery of petroleum oil from the subterranean formation is uneconomical.

In another embodiment of this invention after the initial surfactant or surfactant-containing solution has been injected into the reservoir and a sufficient amount of displacing liquid has been injected to displace the surfactant or surfactant-containing solution from the well bore a radial distance of about 3–6% of the distance between the injection well and the producing well, a slug of gas as heretofore defined is injected through the injection well and into the formation to cause substantially complete foaming of the surfactant in situ, thereby forming a tenacious foam bank. Sequential slug injection of the surfactant, displacing liquid and drive gas is then continuously repeated until such time as further production of fluids from the subterranean formation becomes economically prohibitive. In this embodiment the subsequently injected slugs of surfactant or surfactant solution will tend to channel through the formation until they reach the initially generated foam bank thereby replenishing the foam bank which, during movement through the formation and because of lapse of time, has degenerated to some extent thereby decreasing its effectiveness. In other instances depending upon peculiar formation factors, e.g., the permeability and porosity, a plurality of foam banks will be formed within the reservoir one behind the other as production of the reservoir proceeds. In this embodiment volume of the slug of surfactant-containing solution will generally be about 0.01 to 0.30 pore volume, the slugs of displacing surfactant-free, non-gaseous liquid will be about 0.001 to 0.10 pore volume and the individual slugs of gas will comprise about 0.10 to 10 pore volumes each. As stated earlier, this repetitive slug injection is continued until further oil recovery is impractical.

The advantages of the foregoing methods can be readily comprehended in that foam is not formed within the immediate vicinity of the injection well whereby subsequent injection of fluids or a driving fluid, such as either gas or a combination driving fluid such as gas and water, is facilitated at lower pressures. In addition where repetitive slugs of surfactant solution and liquid are injected between slugs of gas, the slugs of surfactant solution after the initial formation of a foam bank tend to supplement and augment the bank of foam generated in situ at the residual-oil drive-gas interface. By the formation of foam within the reservoir preceding the principal drive fluid, additional oil is recovered because the generated foam tends to invade the larger capillaries or interstices of the formation thereby diverting the remainder of the foam and drive fluid into the smaller interstices or capillaries. In addition a foam bank provides a more favorable drive fluid mobility ratio, improves conformance and displacement efficiency and results in more complete displacement of oil from the reservoir. The displaced oil, connate water, foam and gas are recovered from the reservoir through the production wells and are separated from one another by conventional techniques well known in the art.

As a specific example of one embodiment of the invention an oil-bearing-subterranean reservoir has drilled therethrough a plurality of wells conforming to the conventional five-spot pattern. Through the center or injection well there is injected 0.05 pore volume of an aqueous solution containing 0.1% by weight of "Triton X-100" under a pressure of 200 p.s.i. Thereafter 0.01 pore volume of substantially dissolved gas-free, surfactant-free water, is injected at a pressure of 200 p.s.i. to displace the surfactant-containing solution from that area of the formation immediate to the injection well. Thereafter natural gas is injected at a pressure of 200 p.s.i. until it is found that a substantial back pressure is produced which indicates the in situ generation of a foam bank in the reservoir. At this point the injection pressure of the gas is increased to move at least the major portions of the initially injected fluids or the bank of foam through the reservoir to the production wells. Production of fluids from the production wells is carried on until the oil ratio in the produced fluids becomes economically unattractive at which time gas injection into the injection well and fluid production from the production wells are terminated.

The embodiments of this invention in which an exclusive property or privilege is claimed are defined as follows:

1. In the recovery of petroleum from a subterranean formation penetrated by an injection well and a production well wherein a surfactant is first injected into said formation through said injection well, said surfactant being capable of producing a stable foam under formation conditions upon the intimate contact of liquid and gas; and then thereafter disposing a sufficient amount of gas in proximity to said surfactant to generate a foam and thereafter driving said foam through a portion of said formation toward said production well, the improvement which comprises injecting into said formation through said injection well a substantially nongaseous, surfactant-free liquid after said surfactant injection and prior to foam generation, said liquid being sufficient in quantity to substantially displace said surfactant a radial distance equal to about 3–6% of the distance between said injection well and said production well, whereby the generation of foam within that portion of said formation immediately adjacent said injection well is substantially inhibited.

2. The method in accordance with claim 1 wherein said substantially non-gaseous, surfactant-free liquid is miscible with said surfactant.

3. The method in accordance with claim 2 wherein the surfactant is water soluble and is incorporated in an aqueous solution of about 0.01 to 0.30 pore volume and comprises about 0.01 to 10 wt. percent of said solution.

4. The method in accordance with claim 3 wherein said non-gaseous, surfactant-free liquid is water.

5. The method in accordance with claim 4 wherein said foam is driven by a gasiform fluid.

6. The method in accordance with claim 5 wherein said gasiform fluid is natural gas.

7. The method in accordance with claim 2 wherein the surfactant is oil-soluble and is incorporated in about 0.01 to 0.30 pore volume of a liquid hydrocarbon and comprises about 0.01 to 10 wt. percent of said liquid hydrocarbon.

8. The method in accordance with claim 7 wherein said non-gaseous, surfactant-free liquid is a hydrocarbon.

9. The method of recovering petroleum from a subterranean formation penetrated by an injection well and a production well comprising the steps of injecting into said injection well in sequential order.
  (a) a surfactant capable of forming foam under formation conditions when intimately contacted with a liquid and a gas, in an amount sufficient to produce a foam bank at the residual oil and subsequently injected drive fluid interface;
  (b) a quantity of non-gaseous, surfactant-free liquid, the initial slug of which is sufficient in quantity to displace the first injected surfactant from said injection well a radial distance equal to 3 to 6% of the distance between said injection well and said production well, said liquid being substantially miscible with said surfactant;
  (c) an effective quantity of gas to cause substantially complete foaming of the previously injected surfactant; and thereafter repeating said steps to drive at least a portion of the initially injected fluids to said production well.

10. The method in accordance with claim 9 wherein the surfactant is water soluble and incorporated in about 0.01 to 0.30 pore volume of an aqueous solution and comprises about 0.01 to 10 wt. percent of said solution.

11. The method in accordance with claim 10 wherein the non-gaseous, surfactant-free liquid consists essentially of water and comprises about 0.001 to 0.10 pore volume.

12. The method in accordance with claim 11 wherein the amount of gas injected after each quantity of water comprises about 0.10 to 10 pore volumes.

13. The method of recovering petroleum from a subterranean formation penetrated by an injection well and a production well comprising injecting a slug of about 0.01 to 0.30 pore volume of an aqueous solution containing about 0.01 to 10 wt. percent of a surfactant capable of forming foam under reservoir conditions when intimately contacted by gas; injecting a slug of water in an amount sufficient to displace said surfactant solution from said injection well at least a radial distance equal to about 3-6% of the distance between said injection well and said production well, and therafter injecting natural gas to substantially completely foam said surfactant solution and to drive at least a major portion of the first injected materials through said formation to said production well.

References Cited by the Examiner

UNITED STATES PATENTS

| | | | |
|---|---|---|---|
| 2,807,324 | 9/1957 | King et al. | 166—38 |
| 2,866,507 | 12/1958 | Bond et al. | 166—24 |
| 2,896,716 | 7/1959 | Spuroock | 166—38 |
| 3,177,939 | 4/1965 | Holm | 166—9 |

CHARLES E. O'CONNELL, *Primary Examiner.*

JAMES A. LEPPINK, *Examiner.*